Oct. 20, 1953

D. ATLAS 2,656,531

DEVICE TO PERMIT RADAR CONTOUR MAPPING
OF RAIN INTENSITY IN RAINSTORMS

Filed Sept. 12, 1950

INVENTOR.
DAVID ATLAS
BY Wade Koontz AND
Orlando Z. McRy
ATTORNEYS

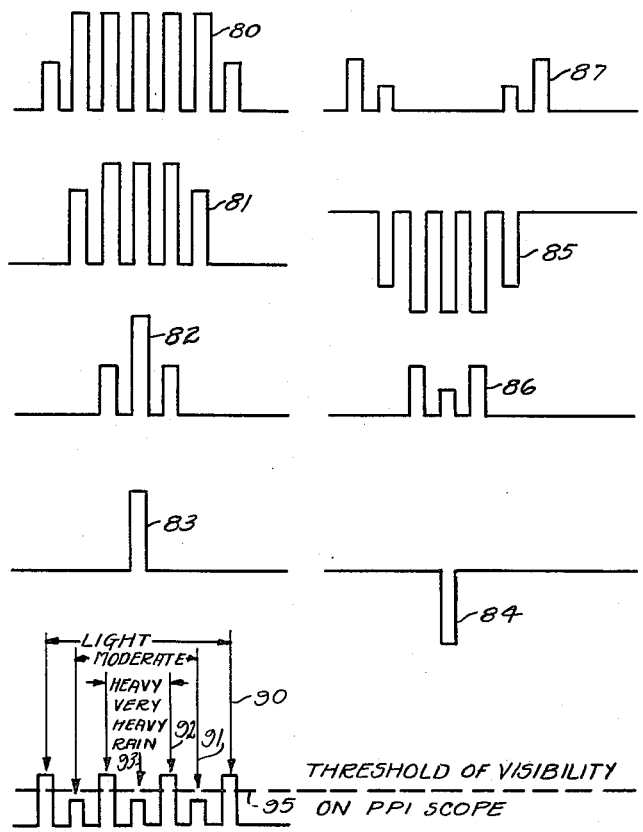

Patented Oct. 20, 1953

2,656,531

UNITED STATES PATENT OFFICE 2,656,531

DEVICE TO PERMIT RADAR CONTOUR MAPPING OF RAIN INTENSITY IN RAINSTORMS

David Atlas, Newton Center, Mass.

Application September 12, 1950, Serial No. 184,507

2 Claims. (Cl. 343—11)

(Granted under Title 35, U. S. Code (1952), sec. 266)

The invention described herein may be manufactured and used by or for the Government for governmental purposes without payment to me of any royalty thereon.

This invention relates to the contour mapping of rain intensity in a storm and more particularly to a means and a method therefor.

In the past storm areas have been observed visually and their severity assumed to be directly variable with the amount of normal light that they intercept under uniform ambient conditions. This type of rough estimate has been subject to considerable limitations and has been a particularly dangerous practice for aircraft pilots and the like for whom an improved procedure is desirable.

The present invention pertains to a means and a method for directing radar transmission towards a storm area and estimating the degree of magnitude of storm intensities by the strength of echo signal returned by the water particles within the storm cloud. In this manner some concept of the relative intensities of water particles within the storm area is provided and permits a pilot to direct his flight course through the less dense areas of the storm rather than into the dense areas thereof. In the practice of the present invention ordinary radar gear may be used to detect rainstorm relative densities from the appearance of the display of storm cross section on the radar scopes. When operating usual radar equipment at high receiver gain even the lightest rain in a storm is displayed and on the plan position indicator or P. P. I. scope presentation it is not possible to distinguish between various intensities of rain.

The present invention provides distinction between steps of rain intensities on the plan position indicator or P. P. I. scope by either of two principal ways. Both ways are based upon the channeling of echoes according to their intensity and alternate inversion and addition to create lines of equal echo power on the scope. The inclusion of a sensitivity time control circuit converts the lines of equal power into lines of equal radar cross-section, which in rain storms are isolines of rain fall intensity or isohyets.

An object of the present invention is to provide a radar adaptation that permits distinction between steps of rain intensities on a plan position indicator or a P. P. I. scope.

Another object is to provide novel circuitry wherein a number of parallel amplifiers with successively greater amplification and alternate positive and negative signal output provide alternate black and white areas, the boundaries of which represent contours of constant received signal.

A further object is to provide novel circuitry using a properly adjusted sensitivity time control circuit to transpose the isopleths of received signal to isopleths of reflectivity.

A further object is to provide means presenting radial and conventional hatch marks to distinguish adjacent areas of positive signals from each other.

An object of the present invention is to provide a means and a method for accomplishing meteorological analysis of storms by indicating the cores of thunderstorms, rainfall gradients in intensities and related information.

Another object is to provide an instrumental tool for use in meteorology and aviation from which rain intensity contour maps may be prepared and read and used in a turbulence warning technique. In a topographical map very closely spaced lines indicate a cliff. In the iso-echo chart or rainfall distribution chart or storm topographic chart contemplated hereby closely spaced contour lines indicate a cliff or rainfall. In entering such a gradient in a thunderstorm, an aircraft would encounter a sudden change in mass of rain creating an impact upon the aircraft that could be of hazardous proportions.

In the accompanying drawings

Figs. 1, 2 and 3 are three perimeters of storm areas on a P. P. I scope derived from three different threshold gain values as background for the present invention;

Fig. 8 is a group of wave forms seen at various test points of the circuit in Fig. 6.

Figure 1:
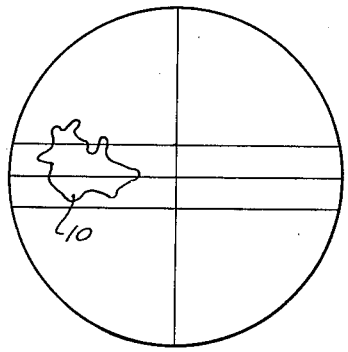
Figure 3:
Figure 2:

The storm contours illustrated at P. P. I. scope presentations in Figs. 1, 2 and 3 of the accompanying drawings and indicated by areas inclosed within outlines 10, 11 and 12 were derived from three power gains at which threshold is reached or at threshold gains at 60, 50 and 40 and threshold power of 1.2, 60 and 1350 μμ watts, respectively throughout. The three gradations indicate progressively diminished echo returns with reduced threshold gain using ordinary radar equipment and practices. The three gradations represent or present three profile outlines 10, 11 and 12 of a rain storm differentiated in terms of the relative disposition of water drops concentrations sufficient to return echo responses to transmitted pulses. This information is of importance to an aircraft pilot in that with the knowledge so provided he may avoid storm areas of maximum water concentrations. The three presentations of outlines 10, 11 and 12 in Figs. 1, 2 and 3 are superimposed in Fig. 4 in the style of a storm topographical chart with the storm perimeter contours combined. This combination of storm perimeter contours to provide an isoecho chart is desirable to an aircraft pilot and its substantially simultaneous presentation is an object of the present invention.

Figure 4:
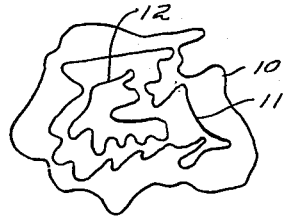
Fig. 4 is a representative storm topographical map.
Figure 5:
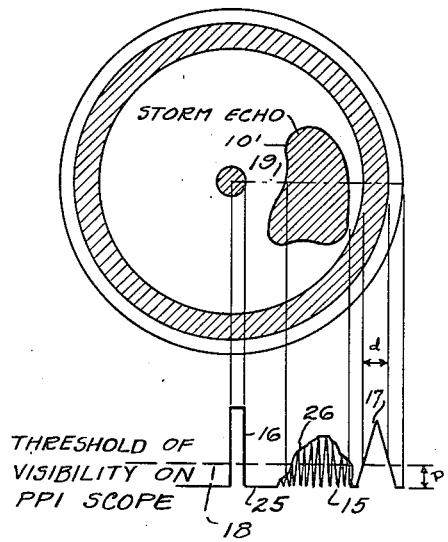
Fig. 5 is a diagrammatic presentation of the presentation in Fig. 4.

The principle of operation for producing the isoecho chart in Fig. 4 is represented diagrammatically in Fig. 5 of the drawings of the relation between an A scope and a plan position indicator or P. P. I. scope. In the diagram there shown the areas within any of the outlines 10, 11 or 12 and represented in Fig. 5 by the line 10' are developed from the output of a highly controlled signal generator that is modulated by an isosceles triangular or a saw tooth wave shape 15 between a transmitted pulse 16 and a signal generator reference 17. The threshold of visibility on the P. P. I. scope is indicated by a dash line 18. The signals 15, 16 and 17 are projected in a common phase indicated by the line 19 normal to the plane of the P. P. I. scope. On an A scope the vertical distance from the base line 25 to the envelope 26 of any signal represents a discrete value of power. Irrespective of variations in the threshold of visibility of the P. P. I. scope or in the receiver sensitivity, equal values of power are required from the storm signal and the generator reference signal to barely illuminate the P. P. I. scope. With the isosceles triangularly modulated signal 15 the required power "$p$" to barely energize the scope is then indicated by the width of the band "$d$" on the P. P. I. scope. The distance "$d$" is then a constant measure of the power level of the isoline of power represented by the perimeter of the storm echo.

Rain intensity contour maps as an aid to aviation and as a turbulence warning technique are accomplished in the exercise of the present invention upon a single P. P. I. scope by the modification of the radar equipment. When so modified the signal phase is reversed sufficiently rapidly to provide electronically successive presentations that are of opposite light intensities and that result in line gradations of a storm contour map that reproduces the disposition and densities of rain drops in the storm area with sufficient particularity and accuracy to provide a pilot with a practical and usable tool for preserving the safety of his aircraft.

A storm presentation obtained by operating a normal radar receiver at maximum gain and that observes the structure of the storm is of uniform opacity, in contrast with the same storm presentation using a radar modified in the manner contemplated hereby to differentiate between the relative components of the storm.

The presentation using the modified radar shows two distinct levels of rain intensities to provide a storm contour. The inner white echo presentations are areas of heavy rain. The adjacent dark band represents light rain. The outermost white band is due to receiver blocking effect.

Rough agreement has been obtained experimentally between the findings derived from the use of the present invention and the findings of a plurality of ground stations spaced two miles apart and beneath the storm. Rainfall distribution charts so obtained are of value in flood warning technique, storm turbulence warning, hydrometeorology, and the like.

Figure 6:
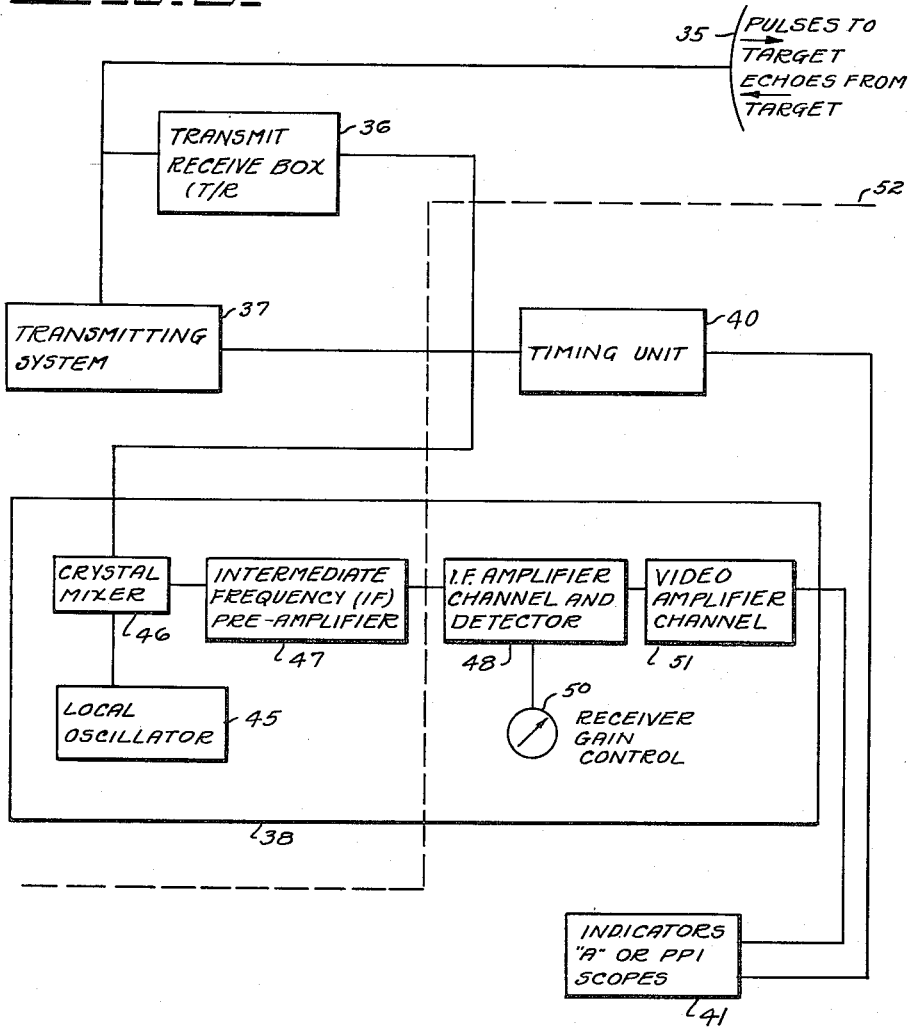
Fig. 6 is a block diagram of a common or standard radar set.

An illustrative usual radar circuit in block diagram form is shown in Fig. 6 of the drawings. In Fig. 6 a parabolic reflector 35 serves both to radiate pulses transmitted from the station and to intercept echoes of the transmitted pulses when reflected back from an intercepted object. A transmitter-receiver or TR box 36 passes pulsed signal originating at a transmitter in the transmitting system 37 and receives echo signal passed to a receiver 38. A timing unit 40 controls the time period between pulses transmitted and of the sweep on an indicator 41. Of interest in the present connection with the receiver are a local oscillator 45 that applies a fixed or local frequency that is passed to a mixer 46 where it is beat against an incoming frequency from the TR box 36 to provide an intermediate frequency. The intermediate frequency or I. F. signal so developed is amplified in an amplifier 47, detected in a detector 48 under the control of a receiver gain control 50 and is passed to a video amplifier channel 51 from which it is passed to the indicator 41 for a usual presentation.

In usual practice, echoes returning on the microwave carrier frequency enter the receiving system at the crystal mixer 46 in Fig. 6, where they are mixed with another microwave frequency generated by the local oscillator 45 and differing from it by an intermediate frequency that may be in the band between 30 and 60 megacycles and hence subject to amplification. The detection of small signals is desirable for the results that are desired herein and toward this objective the crystal mixer 46, local oscillator 45 and the I. F. amplifier 47 are positioned as close to the antenna position as is feasible to minimize the attenuation to which the small microwave echo signals are subjected by traveling over long paths before they are mixed and amplified in the components to the left of the dash line 52 in Fig. 6. With the echo signals so amplified they are sent to the I. F. amplifier channel 48 where the variable receiver gain control 50 is commonly located and also that is near the indicator 41 and remote from the antenna 35. The echo signals are amplified further in the I. F. amplifier channel 48 and then demodulated as video signals for visual reproduction as distinct from audio signals for audible reproduction. The video signals so provided are applied to the indicator 41 as a P. P. I. scope display or presentation.

The signal treatment at the variable receiver gain control 50 in the I. F. channel after amplification is improved in the operation of the present invention. In prior installations when the receiver gain control is varied the overall receiver amplification is reduced so that the weaker signals lack sufficient amplitude to be seen on the indicator 41.

This limitation is minimized in the present procedure by, instead of feeding the I. F. preamplifier 47 output to a signal I. F. amplifier channel 48, the signals are sent to a number of such channels, each of a different amplification. Such a system with four I. F. channels, together with desirable inverting and mixing circuits is illustrated in the block diagram in Fig. 7 of the accompanying drawings.

The circuit there shown may be simplified appreciably by eliminating all but a standard intermediate frequency or I. F. amplifier channel and effecting variations in amplification in the video channels. With this provision the number of required tubes is reduced with corresponding decreased weight. The I. F. matching network may also be eliminated but this introduces the problem of obtaining linear amplification of all signals ranging from those due to the very lightest detectable rain to the very heaviest rain. If the antenna were held fixed and pointing toward a storm, the appearance of the storm echo on an A type oscilloscope attached at various output points of this circuit would be similar to those shown in Fig. 8. For simplicity, these displays show only a single pulse returned from each intensity of rainfall as compared with a multiple channel circuit presentation on a P. P. I. scope that would show a plurality of dark and light areas with each reversal of phase.

Figure 7:
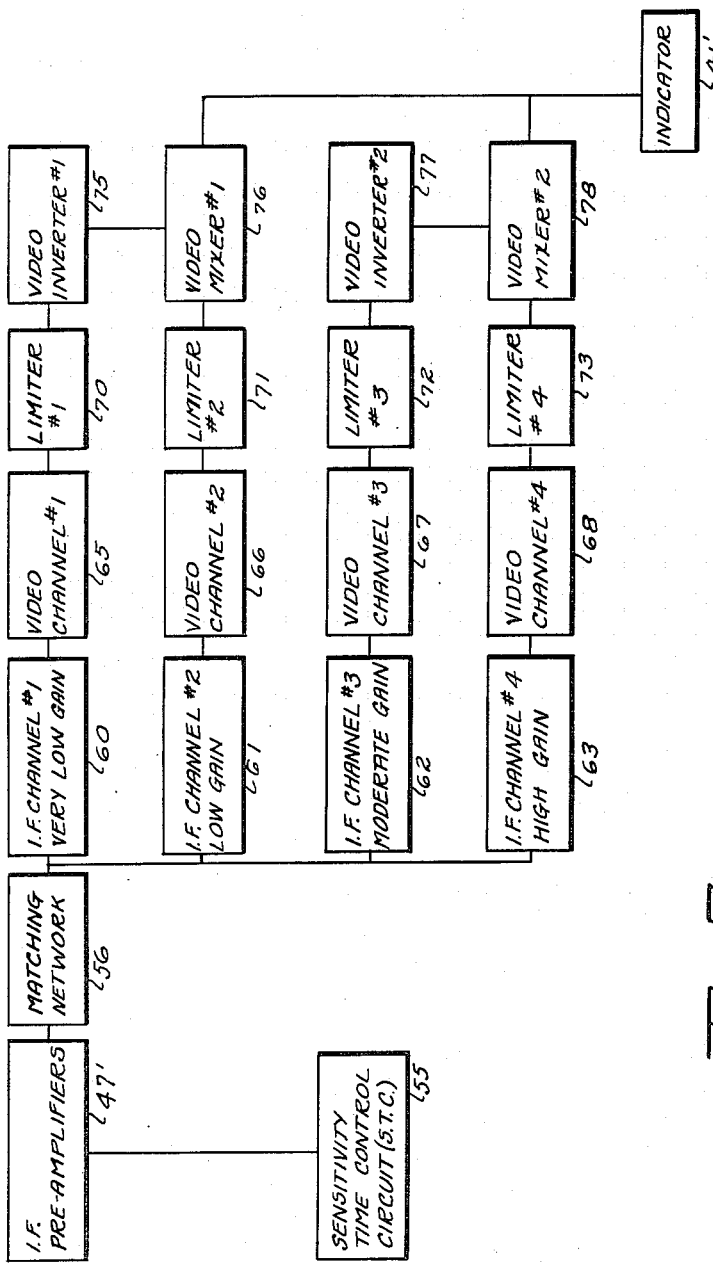
Fig. 7 is a block diagram of a radar set modified as contemplated herein.

In the circuit shown in block diagram in Fig. 7 of the drawings, signal amplified in the I. F. preamplifier 47', under the control of the sensitivity time control circuit 55, applies its output to a matching network 56. The output from the matching network 56 is applied to a desired plurality of I. F. channels 60, 61, 62, 63 etc., that separately are of distinct and different overall amplification or gain values and that open into distinct and separate video channels 65, 66, 67, 68, etc., connected in parallel. The video channels 65, 66, 67, 68, etc., apply their outputs separately to limiters 70, 71, 72, 73, etc., that in turn apply their outputs to a video inverter 75, to a video mixer 76, to a video inverter 77, to a video mixer 78, etc., connected in parallel, respectively, throughout. The video inverter 75 passes its output to the video mixer 76 that passes its output for presentation to the indicator 41'. The video inverter 77 passes its output to the video mixer 78 from which the mixed output is also applied to the indicator 41'.

The presentation on the screen of the indicator 41' comprises a desired plurality of different gain values, as determined by the setting of the I. F. channels 60, 61, 62, 63, etc., signal from adjacent gain values, such as the I. F. channels 60 and 61, for example, were impressed upon an inverter and mixer, such as the inverter 75 and the mixer 76, for example, respectively throughout and then impressed simultaneously for presentation upon the indicator 41'. A storm contour map results in the display on the screen of a cathode ray tube in the indicator 41' since each channel 60, 61, 62, 63, etc., of different gain results in its own strength of echo signal, and since the signals of successively different strength are being continuously inverted into contrasting areas or lines by the inverter 75 and mixer 76, for example, and since all echo signals from all channels are presented simultaneously in the display to be viewed on the indicator 41'.

In the circumstance illustrated in Fig. 7, intermediate frequency or I. F. channel 63 has high amplification so that echoes from even the lightest rainfall have sufficient amplitude to appear on the indicator 41'. Echoes from all rainfall of moderate or higher intensity are then so strong as to appear saturated. The output from limiter 73 is shown at signal 80 in Fig. 8.

Intermediate frequency or I. F. channel 62 has moderate gain so that echoes from all rainfall of moderate or greater intensity are shown on the indicator 41'. Echoes from heavy rainfall and above are saturated. The output of the limiter 72 is shown at signal 81 in Fig. 8.

I. F. channel 61 has low amplification so that only echoes of rain of heavy and greater intensity are displayed. Very heavy rain echoes are saturated. Output of the limiter 71 is shown at signal 82 in Fig. 8.

I. F. channel 60 has such low amplification that only the heavy rain echoes are displayed. Output of the limiter 70 is shown at signal 83 in Fig. 8.

Operatively, the inverter 75 inverts the positive signals 83 from the first channel making them negative, as shown at signal 84 in Fig. 8, so that they may be subtracted from the positive signals shown at signal 82 of the second channel in the video mixer 76, to provide as output signals 86.

The inverter 77 inverts the positive signals 81 of channel No. 3 as 85 so that they may be subtracted from the positive signals 80 of channel No. 4 in mixer 78 to provide as output signals 87.

All of the channels have variable gain controls and variable limiting levels so that the desired amplitudes may be obtained. The signal indicator input 88 is fed into the indicator 41' and comprises echo presentations of light rain 90, moderate rain 91, heavy rain 92 and very heavy rain 93, as indicated in Fig. 8. The dash line 95 indicates the threshold of visibility on the plan position indicator or P. P. I. scope.

In the presentation on the P. P. I scope the area of maximum rain intensity appears as a blank spot 93' or area of no signal, surrounded by a bright band 92' indicating rain of heavy intensity. The heavy rain intensity band 92' is surrounded by a dark moderate rain intensity band 91' that in turn is surrounded by another light rain intensity bright band 90'. The area of light rain intensity band 90' is shown as a bright band to insure that the total rain area is distinctly outlined. With this provision even the weakest detectable rains are indicated in the presentation on the P. P. I. scope.

If it be assumed that there is always some finite gradient of rainfall intensity in a storm, the system described herein will display on the P. P. I. scope of a radar set modified as shown in Fig. 7 and as described heretofore, storms of light rain intensity as a single bright spot; storms of moderate intensity are displaced as a blank core surrounded by a single bright band; heavy storms appear as a bright core surrounded by a black band and outwardly thereof an outside bright band. The display for heavy storms would bear the characteristics of the described storm presentation with the addition of a black core disposed inwardly of the bright area.

Upon viewing such a presentation it will be apparent that by counting the number of bands, an estimate may be made as to the degree of intensity of the storm. It will be apparent further that the addition of increased numbers of channels to the illustrative channel shown in Fig. 7 of the accompanying drawings will increase the number of relative rain intensities into which a bad storm may be divided. Each band in such a display represents an isohyet or line of equal rain intensity, if the effects of rain attenuation be neglected. It is to be noted that in the display the isolines will blend together where the rainfall gradient is sufficiently great as to occur within the range or the azimuthal resolving power of the radar. The accuracy of the storm contour map displayed upon the radar P. P. I. scope may be increased particularly in range as the aircraft approaches the storm by decreasing the radar pulse width. In cases wherein it is only necessary to locate the storm at a large distance away wider pulses may be used to permit the detection of the lighter intensities of rain at greater ranges.

Additional distinction may be given to the bright bands in heavy storm presentations by electronic hatching on the radar scope. Radial hatching marks on the outer bright band are accompanied by selecting alternate unblanking pedestal voltages on which the video signals are usually superimposed, inverting them and applying these unblanking voltages to the video mixer 78 in channel 4 of the circuit shown in Fig. 7. Thus the output of the video mixer 78 will be sufficiently positive to intensify the P. P. I. tube only during alternate sweeps giving the radial striation effects. Parallel hatch marks produce a circularly striated pattern when the blanking is made to occur in range every other one or two microseconds by the use of a microsecond ringing circuit. The circularly striated pattern blanking signals are applied to video mixer 76 in the circuit shown in Fig. 7 of the drawing. Where desired, a combination of radial and circularly extending hatch marks may be accomplished electronically to give a cross hatched area on the scope.

For storms at constant range the intermediate frequency channels are sensitive to decrete levels of rain intensity. For storms at all ranges, the use of a sensitivity time control circuit is required. Mathematically the signal echo power of the rain in a storm substantially varies as the inverse square of the target range or $$P_r = C \frac{Na^6}{R^2}$$

where $P_r$ is equal to the received echo power in watts, C=constant for a particular radar set expressed in watts per meter, N=number of raindrops per unit, as one drop per cubic meter, $a^6$=mean sixth power of the radii of the number of raindrops per cubic meter illuminated expressed in meters, and $R^2$=square of the distance in meters from the radar to the storm.

In order to have all echoes from equally intense storms appear at equal amplitudes on the radar A scope regardless of range, or to permit the display of undistorted rainfall contour maps on the plan position indicator scope, it is necessary to amplify the echo power directly as the square of the target range, which is equivalent to amplifying the voltage amplitudes directly as the range. This is accomplished by the sensitivity time control circuit which applies a voltage to the intermediate frequency preamplifier 47 that varies in time so as to increase the voltage amplification directly as the range.

With the above provision, an echo from a rainstorm 10 miles away toward which a radar is directing its pulse output, is amplified twice as much as an echo from an equally intense target five miles away, thus displaying the echoes at equal amplitudes on the A scope.

The sensitivity time control voltage is applied to the intermediate frequency preamplifier 47 because it is desired to channel the signal output of the preamplifier according to the rain intensity of the storm. The only indication of rain intensity is the corresponding amplitude of the signal. It is necessary to correct signal amplitudes before channeling takes place.

One appreciable effect prohibits the echoes from rainfall of equal intensities from being displayed at equal amplitudes upon the A scope, or the display of an undistorted rainfall contour chart on the P. P. I. scope. Because electromagnetic energy is attenuated due to absorption and scattering by raindrops, echoes from the far side of a storm will appear to be weaker than those from equal rainfall intensities on the near side. This effect will be such as to distort the isopleth pattern on the P. P. I. indicator. With sufficient experience an operator may interpret the patterns to minimize the effect of attenuation. At S band frequencies and below rainfall attenuation substantially may be neglected except for extremely heavy rain and great distances of propagation.

It is to be understood that the means and the method described herein are submitted as illustrative and operative embodiments of the present invention and that similarly operating modifications thereof may be made without departing from the scope of the present invention.

What I claim is:

1. A meteorological storm analyzing device indicating rain intensity gradients with modified radar equipment, comprising a radar having an antenna directable toward the storm, a transmit-receive box, a transmitter and a receiver of said radar inclusive of an indicator and a matching network, a plurality of channels of distinct and different overall amplification to separate distinct pulses returned from each intensity of rainfall illustratively based on very low gain for heaviest rainfall, low gain for next heaviest rainfall, moderate gain for lighter rainfall, and high gain for lightest rainfall, a limiter in each of said channels and producing a square wave output, a first inverter following the limiter in the very low gain channel for inverting the square wave limiter output therein, a first mixer following the limiter in the low gain channel for mixing the square wave limiter output therein with the output from the very low gain channel inverter to provide a first mixed output to said indicator, a second inverter following the limiter in the moderate gain channel for inverting the square wave limiter output therein, and a second mixer following the limiter in the high gain channel for mixing the square wave limiter output therein with the output from the moderate gain channel inverter to provide a second mixed output to said indicator for substantially optically simultaneous presentation with said first mixed output in indicating rain intensity gradients.

2. A meteorological storm analyzing circuit, comprising a radar circuit containing an intermediate frequency preamplifier, a sensitivity time control circuit controlling said preamplifier, a matching network receiving the output from said preamplifier, a plurality of intermediate frequency channels of distinct and different gain values receiving the output from said matching network, a video channel in each of said intermediate frequency channels, a limiter connected with the video channel in each of said intermediate frequency channels, an inverter connected with the limiter in alternate intermediate frequency channels, a mixer in the intermediate frequency channels alternating with the channels containing the inverters and connected in pairs with the inverters, and an indicator deriving its input from said mixers and having a screen providing optically simultaneously a storm presentation of a plurality of different gain values from said intermediate frequency channels.

DAVID ATLAS.

References Cited in the file of this patent

UNITED STATES PATENTS

| Number | Name | Date |
|---|---|---|
| 2,416,895 | Bartelink | Mar. 4, 1947 |
| 2,433,681 | Blumlein | Dec. 30, 1947 |
| 2,480,038 | Mason | Aug. 23, 1949 |
| 2,509,207 | Busignies | May 30, 1950 |
| 2,523,283 | Dickson | Sept. 26, 1950 |
| 2,535,274 | Dicke | Dec. 26, 1950 |